United States Patent [19]
Eschbach et al.

[11] Patent Number: 5,097,253
[45] Date of Patent: Mar. 17, 1992

[54] ELECTRONIC SECURITY DEVICE

[75] Inventors: Eugene A. Eschbach, Richland; Edward J. LeBlanc; Jeffrey W. Griffin, both of Kennewick, all of Wash.

[73] Assignee: Battelle Memorial Institute, Richland, Wash.

[21] Appl. No.: 595,778

[22] Filed: Oct. 9, 1990

Related U.S. Application Data

[63] Continuation of Ser. No. 294,207, Jan. 6, 1989, abandoned.

[51] Int. Cl.⁵ .............................................. G08B 13/08
[52] U.S. Cl. .................................... 340/545; 340/658; 340/660; 340/691; 368/10
[58] Field of Search ........ 340/545, 541, 550, 555–556, 340/542, 561–562, 567, 571, 521, 539, 505, 658, 660–661, 652, 691; 368/10–12

[56]  References Cited

U.S. PATENT DOCUMENTS

| | | | |
|---|---|---|---|
| 3,406,386 | 10/1968 | Hawkins | 340/545 X |
| 3,714,644 | 1/1973 | Hellstrom | 340/542 X |
| 3,938,124 | 2/1976 | Way et al. | 340/280 |
| 3,958,240 | 5/1976 | Richardson, III | 340/502 |
| 4,233,595 | 11/1980 | Landkammer | 340/542 |
| 4,262,284 | 4/1981 | Stieff et al. | 340/542 X |
| 4,278,968 | 7/1981 | Arnett et al. | 340/545 |
| 4,401,980 | 8/1983 | Rittenbach et al. | 340/541 X |
| 4,447,123 | 5/1984 | Page et al. | 350/96.24 |
| 4,476,461 | 10/1984 | Carubia | 340/667 |
| 4,523,186 | 6/1985 | Fiarman | 340/555 |
| 4,540,980 | 9/1985 | Porco | 340/586 |
| 4,587,517 | 5/1986 | Engstrom et al. | 340/542 |
| 4,680,574 | 7/1987 | Ruffner | 340/571 |
| 4,691,195 | 9/1987 | Sigelman et al. | 340/545 |
| 4,746,909 | 5/1988 | Isreal et al. | 340/568 |
| 4,797,663 | 1/1989 | Rios | 340/541 X |
| 4,804,945 | 2/1989 | Millet | 340/541 |

FOREIGN PATENT DOCUMENTS

| | | |
|---|---|---|
| 2749720 | 5/1979 | Fed. Rep. of Germany . |
| 2952007 | 6/1981 | Fed. Rep. of Germany . |
| 2454660 | 12/1980 | France ............................... 340/545 |

OTHER PUBLICATIONS

Campbell, "Electronic Self-Monitoring Seal", *Nuclear Materials Management, 1978 INMM Proceedings*, pp. 424–430.

*Primary Examiner*—Jin F. Ng
*Assistant Examiner*—Thomas J. Mullen, Jr.
*Attorney, Agent, or Firm*—Dellett, Smith-Hill and Bedell

[57]  ABSTRACT

The present invention relates to a security device having a control box (12) containing an electronic system (50) and a communications loop (14) over which the system transmits a signal. The device is constructed so that the communications loop can extend from the control box across the boundary of a portal such as a door into a sealed enclosure into which access is restricted whereby the loop must be damaged or moved in order for an entry to be made into the enclosure. The device is adapted for detecting unauthorized entries into such enclosures such as rooms or containers and for recording the time at which such entries occur for later reference. Additionally, the device detects attempts to tamper or interfere with the operation of the device itself and records the time at which such events take place. In the preferred embodiment, the security device includes a microprocessor-based electronic system (50) and a detection module (72) capable of registering changes in the voltage and phase of the signal transmitted over the loop.

34 Claims, 8 Drawing Sheets

ELECTRONIC SECURITY DEVICE

This invention was made with government support under contract DE-AC06-76RLO 1830 awarded by the U.S. Department of Energy. The government has certain rights in the invention.

This is a continuation of application Ser. No. 07/294,207 filed Jan. 6, 1989 and now abandoned.

BACKGROUND OF THE INVENTION

The present invention relates to systems for detecting unauthorized entries into rooms or containers into which access is restricted.

Sensitive, dangerous or valuable materials are frequently stored in and shipped from sealed enclosures such as restricted access rooms, cabinets, containers or processing vessels having portals such as doors or lids by means of which entrance is obtained. In the past, devices commonly referred to simply as seals have been applied to the portals of such enclosures. Since these devices are damaged by unauthorized entry, such damage serves as evidence of the unauthorized entry. Unfortunately, the prior devices do not allow for the time of an unauthorized entry to be recorded, do not provide sufficient means for detecting efforts to interfere with the proper operation of the seals, and are otherwise less effective than desired.

It is therefore an object of the present invention to provide an improved security device capable of registering unauthorized entry into sealed enclosures, and for recording the times at which such events take place.

It is another object of the present invention to provide such a system capable of reporting its status to a central watch station.

It is another object of the present invention to provide an improved security device which is difficult to circumvent and which is sensitive to attempts to interfere with the device itself, registering and recording the times of such attempts.

It is a further object of the present invention to provide an improved security device which is inexpensive to construct and yet reliably performs its function with great efficiency and low energy drain.

SUMMARY OF THE INVENTION

The present invention constitutes a device for detecting security breaches due to tampering with sealed enclosures. For example, when tampering takes place or when an unauthorized entry is made through a door to a room into which access is restricted, the present invention registers the event and records the time of its occurrence.

The security device according to the invention comprises a control box linked to a communications loop such as a conductive wire over which a signal is transmitted and received by an electronic system. If the communications loop is tampered with or the signal is interrupted, the electronic system detects this event and records the time of its occurrence for later reference. In use, the device is applied by installing the control box and the communications loop at one of the boundaries defined by a portal into an enclosure so that the portal cannot be opened without breaking the loop and interrupting the signal.

In the preferred embodiment, the electronic system is microprocessor-based and comprises a detection module which resolves the voltage level and phase of a signal transmitted over a communications loop. The microprocessor executes a program whereby it samples voltage level and phase data generated by the detection module, and registers significant changes in these data keeping track of changes in real time. Thus, the initial voltage and phase data is suitably stored and compared with later data. The actual initial impedance of the loop need not be known or calculated, and can be the random impedance of a randomly selected loop having random orientation. Any subsequent change in the impedance will be detected.

The electronic system also comprises a clock module and a digital time display subject to control by the microprocessor when data changes associated with tampering events occur. The microprocessor may record the time of the event by accessing time data kept by the clock module for reference and later display and/or by "freezing" the time display to show the time of the tampering event. The status of the system may be communicated to a central watch station or the like.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT

Figure 1:
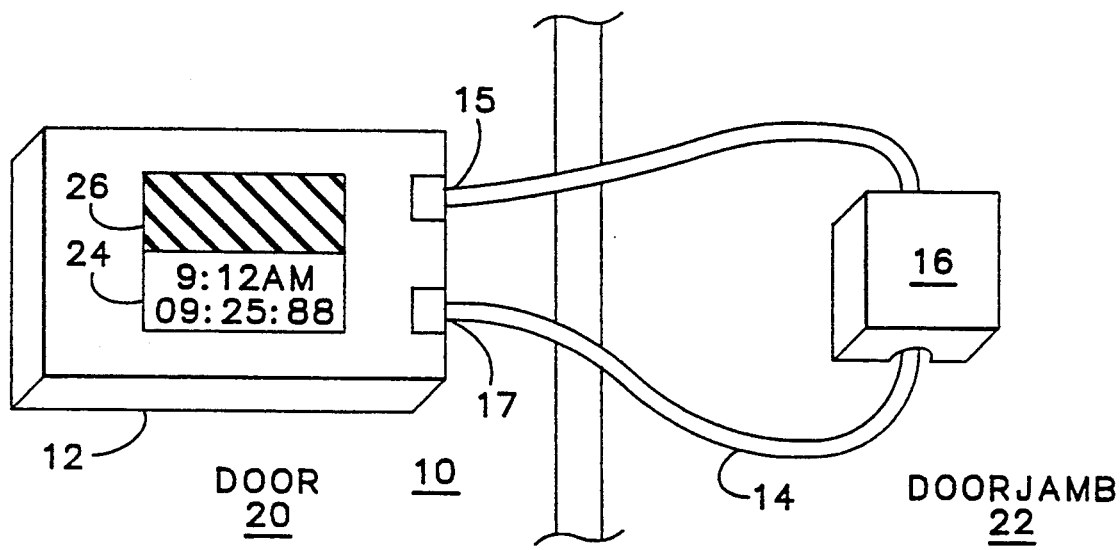
FIG. 1 is a front view of the security device of the present invention as may be installed on a door to a sealed room.

Referring now to FIG. 1, the present invention constitutes a security device 10 comprising a tamper-resistant control box 12 adapted for being fastened to a structural surface, and a lead or loop 14 of wire separately secured at its ends 15 and 17 to one side of the control box 12. The control box 12 includes a metal or plastic case having reinforced walls and is sufficiently rugged so as to be able to withstand a certain amount of physical abuse while being large enought to house electronic components sensitive to impedance changes in the loop as occasioned by breaking or tampering with the loop.

The loop 14 is suitably constructed of electrically conductive wire such as Nichrome wire having an impedance distributed along its length which may be random and unknown as to its exact value. The resistivity or other impedance component may vary along the length of the conductive wire, and the loop may comprise a randomly selected piece of such wire making a given loop very difficult to duplicate. Thus, merely shorting the loop or providing a substitute loop will be noneffective for an intruder trying to bypass the device. One or more fittings 16 enable the far end of the loop opposite the control box 12 to be secured to another surface, i.e., a surface different from the surface to which the control box 12 is attached. The security device 10 is intended for being fastened across a boundary of a portal to an enclosure into which access is restricted. For example, the control box 12 may be secured to the door 20 of a sealed storage cabinet while the fitting 16 is secured to the door jamb 22 whereby the loop 14 extends across the boundary between the door 20 and the jamb 22. The positioning of the security device 10 insures that entrance to the sealed cabinet can only be effected by breaking the loop 14.

The control box 12 may be provided with a clock display 24 associated with a clock module and a graphics display 26 that are both located on its front face. The clock display 24 is operative for showing a time and a date while the graphics display 26 is adapted for drawing attention to the device 10 by flashing between different types of geometric patterns when the loop is violated. Both of the displays 24 and 26 are covered by a layer of clear shock-resistant plastic in order to afford a degree of protection against abuse.

Figure 2:
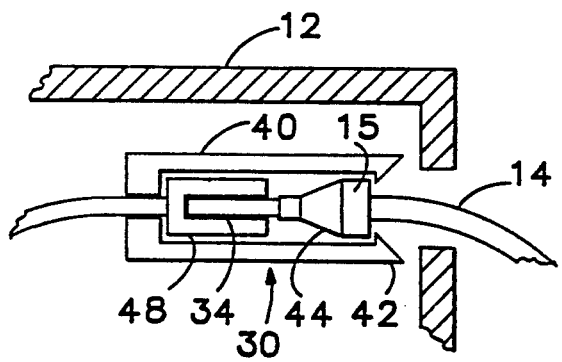
FIG. 2 is a cross-sectional view of one of the fasteners used in the present invention for securing the communications loop of the present invention to a control box.

Fasteners 30 may be provided for securing a first end plug 15 and a second end plug 17 of the loop 14 to the control box 12. As shown in FIG. 2, a fastener 30 comprises a pair of resilient clips 40 having latching members 42. The latching members 42 spring apart when the loop end plug 15 is admitted into the fastener 30, but anchor the loop end plug 15 to the fastener 30 by gripping the restraining ring 44 of the loop end plug 15 when it is fully engaged with the fastener. Whenever the loop end plug 15 is so engaged, it makes electrical contact at its tip 34 with electrical connector 48 whereby the loop 14 is interfaced with the electrical components within the control box 12.

Figure 3:
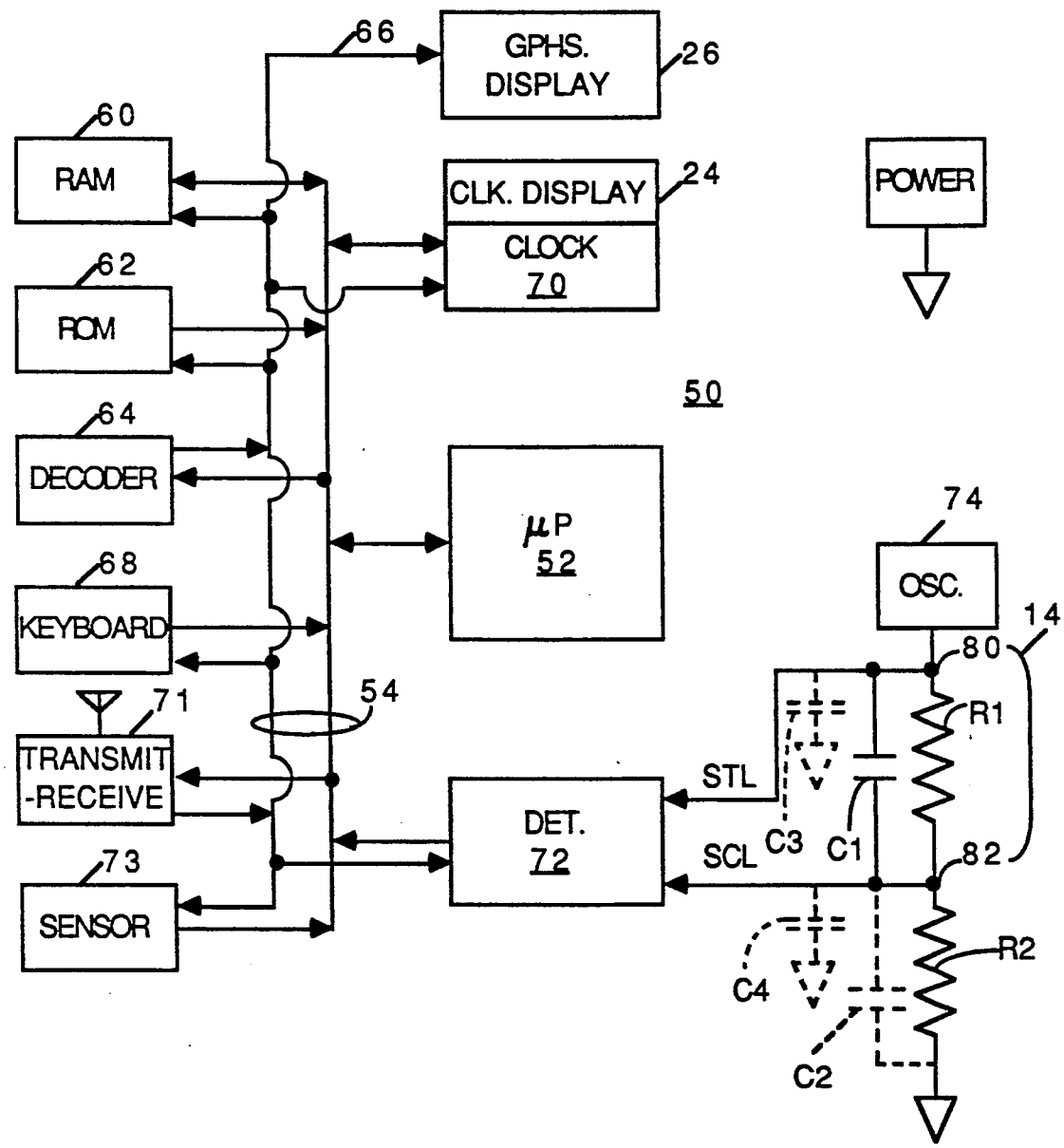
FIG. 3 is a functional block diagram of the electronic system associated with the control box of the present invention.

Referring now to FIG. 3, the microprocessor based electronic system 50 associated with the control box 12 includes a microprocessor 52 such as an Intel model 8085. The microprocessor 52 is connected over a bus 54 to the RAM memory unit 60, ROM memory unit 62, decoder 64, input keyboard 68, clock module 70, and detection module 72. The RAM unit 60, ROM unit 62, decoder 64, and keyboard 68 are conventional in construction and function in a known manner. The RAM and ROM memory units 60 and 62 provide volatile storage for program data and non-volatile storage for the software governing the operation of system 50. The decoder 64 receives address information from the microprocessor 52 in accordance with which it supplies suitable chip select signals over the control lines 66 to the various components of the system 50 required to access the bus 54 during particular steps in the operation of the system. The input keyboard 68 allows the operator to input data to the microprocessor 52, e.g. as may then be employed in setting the clock 70, and starting, or resetting, the system 50 after the system has registered a tampering incident. A power supply of a type suitable for long term operation such as an alkaline battery supplies the required power to the active components of the system. The control box 12 further contains an oscillator 74 that generates an alternating current signal for transmission through the loop 14.

The clock and detection modules 70 and 72 function in coordination with the system software to provide a mechanism for detecting tampering events indicative of unauthorized entries or interference with the operation of the device 50 itself, and record when such entries or interferences take place. The detector 72 receives two input signals STL and SCL corresponding to the signal generated by an oscillator 74 as supplied to node 80 at one end of the loop 14 and the signal received by node 82 at the other end of the loop 14 (after transmission over the loop). The resistance R1 represents the impedance of the loop 14 between the nodes 80 and 82 and acts in cooperation with additional resistance R2, positioned between the node 82 and ground, to form a voltage divider that sets the normal voltage level of the signal SCL. The capacitance C1 represents capacitance associated with the loop 14 which is partially operative for setting the phase difference between the signals STL and SCL and may comprise an actual capacitor shunted across the loop 14 as shown, or may represent capacitance otherwise associated with the loop. Capacitors C3 and C4 represent distributed shunt capacitance of the loop with respect to ground. In addition, the loop may exhibit inductive reactance. Resistor R2 can be shunted with a capacitor C2.

Figure 4:
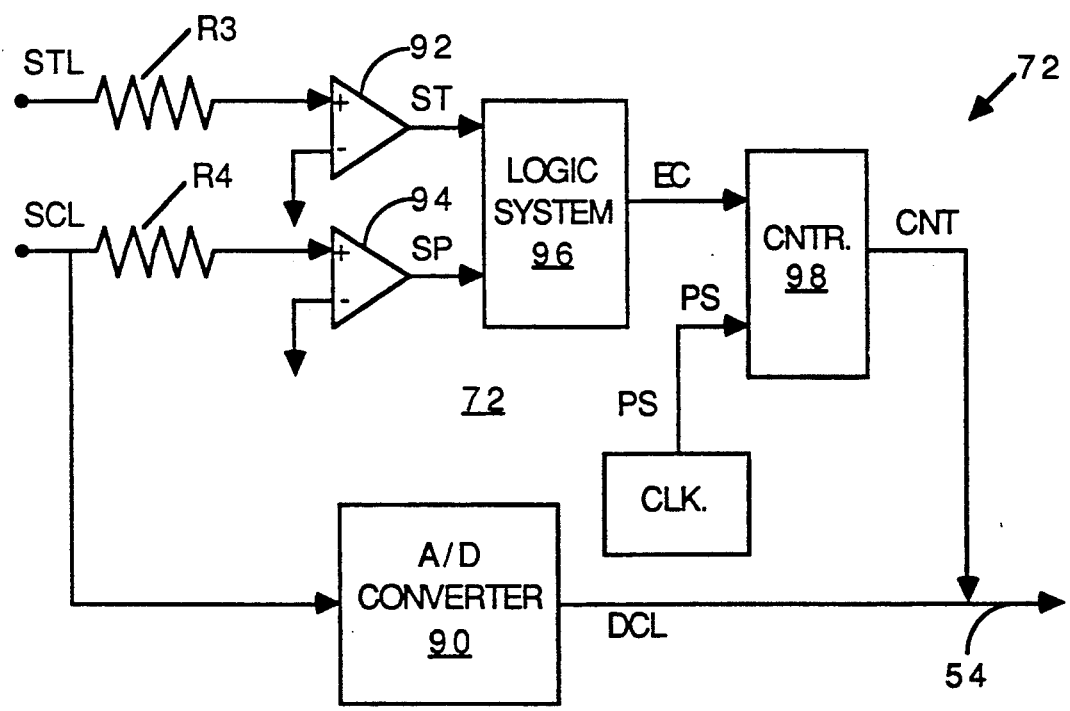
FIG. 4 is a detailed functional block diagram of the detection module component of the present invention.

Referring now to FIG. 4, the detection module 72 is shown in greater detail. Analog-to-Digital converter 90 ("A/D" converter) processes the signal SCL and furnishes a digital signal DCL indicative of the voltage level at the node 82, the latter being a function of the impedance normally associated with the loop 14. The data carried by the signal DCL is supplied over the bus 54 to the microprocessor 52 when the A/D converter is enabled onto the bus 54 by the decoder 64.

The detection module 72 also comprises comparators 92 and 94 connected for receiving the signals STL and SCL, respectively, by way of the resistors R3 and R4. The comparators 92 and 94 are referenced to ground and therefore produce a high level signal only when the signals STL and/or SCL are greater than zero. However, since a phase difference exists between the signals STL and SCL as a function of the impedance of the loop 14, the comparators 92 and 94 switch and provide high level outputs at different times. The logic circuit 96 comprises a state machine of conventional design which supplies a signal EC for enabling the operation of counter 98 when the signal ST from the comparator 92 goes high and terminating this signal when the signal SP from the other comparator 94 goes high. The counter 98 is operated by a clock (CLK) outputting a periodic signal PS composed of regular pulses registered by the counter 98 when it is operationally enabled. The counter 98 provides a digital signal CNT representative of the time difference between the signals ST and SP and therefore the phase difference between the signals STL and SCL. The data carried by the signal CNT from the counter 98 may be supplied over the bus 54 to the microprocessor 52 as the counter is enabled onto the bus 54 by the decoder 64. The microprocessor determines whether the value of signal SCL and its phase relative to signal STL are representative of a properly connected, i.e., non-violated, loop. Of course, if the loop is broken, intrusion will be indicated. Moreover, disturbing the configuration or shape of the loop by tampering with the same will tend to change its complex impedance and register an intrusion. It will also be seen that merely shorting the loop or applying a voltage to a loop terminal would be ineffective in disguising an attempted break-in, and if the value of the impedance of the loop 14 is random and unknown, sophisticated tampering techniques will usually be rendered ineffective.

The clock module 70 keeps track of real time and includes the clock display 24 whereby time readings may be displayed to the operator. The clock module 70 is a conventional type real time clock such as a model MM58167 clock unit manufactured by National Semiconductor Company of Santa Clara, Calif. The clock module 70 is connected to the bus 54 in order to allow the microprocessor 52 to control its operation. The operator may set the time kept by the clock module 70 by using the keyboard 68 to enter the desired time reading via microprocessor 52.

In operation, a power source is installed in the control box 12 and the control box 12 is secured to the door 20, while the far end of the loop 14 is attached to the doorjamb 22 through the use of a fitting such as the fitting 16, or hooked through part of the existing structure of the doorjamb 22. First and second ends 15 and 17 of the loop 14 are then fully engaged with fasteners 30.

Figure 8:
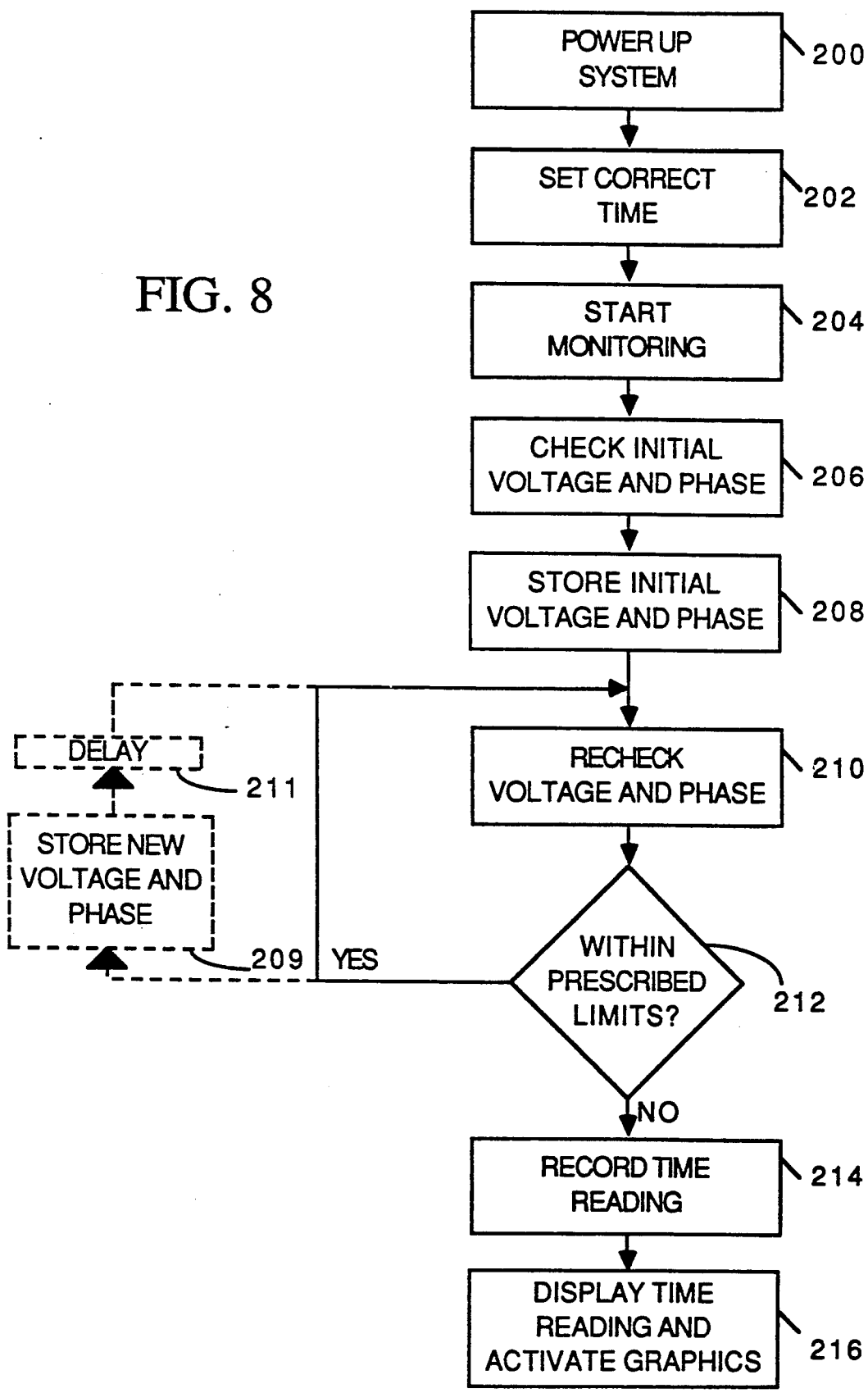
FIG. 8 is a flowchart of the overall process of operation of the software for the microprocessor portion of the present invention.

Referring to FIG. 8, the system 50 is first powered up in step 200 and the software governing the operation of the system is then entered. In step 202, clock module 70 is set to the correct time by the microprocessor 52 in accordance with data entered by the operator into the system via keyboard 68. The clock display 24 should then show a correct real time reading. As indicated in step 204, the operator may use the keyboard 68 to enter a security code which starts automatic monitoring of loop 14 by the system 50.

In steps 206 and 208, the voltage level and phase difference measured by the detection module 72 are initially checked pursuant to the microprocessor 52 reading out a first set of data from the A/D converter 90 and counter 92, and this data is stored in memory for future reference. The program proceeds to steps 210 and 212 in which the voltage level and phase difference are rechecked as a subsequent set of data is read from A/D converter 90 and counter 92. In step 212, the new data is compared with the data previously stored in memory to determine whether the new measurements are within a predetermined or prescribed tolerance range of the previous measurements. If the data indicates the new measurements are within prescribed range, the program automatically returns to step 210 for again rechecking the voltage and phase. It should be noted that steps 210 and 212 form an integral loop that is continuously executed during the operation of the system 50 for the purpose of detecting voltage and phase variation. The steps 209 and 211 shown in phantom may be executed as an alternative to having the program loop directly back to step 210 from step 212. In step 209, the new data read out from the A/D converter 90 and counter 92 in step 212 is stored in memory for future reference, replacing the data stored in step 208. Pursuant to step 211, further execution of the program is delayed for a significant period. Through the implementation of steps 209 and 211, the system 50 is adapted to account for any gradual "drift" in the measurements taken with respect to voltage and phase due to temperature changes and the like. Step 211 prevents the system from adapting too rapdily to changing conditions which may in fact be due to tampering.

If the data indicates that new measurements are outside a prescribed tolerance range, then the program proceeds to step 214 in which the current time is read out of the clock module 70 and recorded in the RAM memory 60 for later use, while the graphics display is activated to show a flashing pattern indicating that a tampering event has been detected. The time reading recorded in memory may be accessed by the operator, as indicated in step 216, upon entry of the correct security code whereupon the program directs the time reading to be displayed on the clock display 24. Alternatively, a continuously visible clock display 24 may be "frozen" at the current time reading in step 214, thereby providing an immediate indication of the time at which the system 50 detected a tampering event.

The system of FIG. 3 is additionally desirably provided with a communications link to a central watch station (not shown) via block 71 which may comprise a radio transmitter or transmitter-receiver that transmits a signal to the central station when loop 14 is violated to provide a central alarm. An r.f. signal may be initiated, or coded modulation may be provided on a continuous carrier. Alternatively, a plurality of devices according to the present invention may be monitored or interrogated on a programmed or random basis from a central station, with each device providing its own distinguishable check-in signal. As a substitute for radio communication means, ultrasonic or optical communication means may be employed.

For communications purposes, an identification code may be stored in the random access memory 60 of each security device, and if the loop 14 is broken or tampered with, the identification code is automatically destroyed or erased. On interrogating each device, a key code may be sent by the central station to each security device which responds indicating whether the key code is correct or not.

Figure 5:
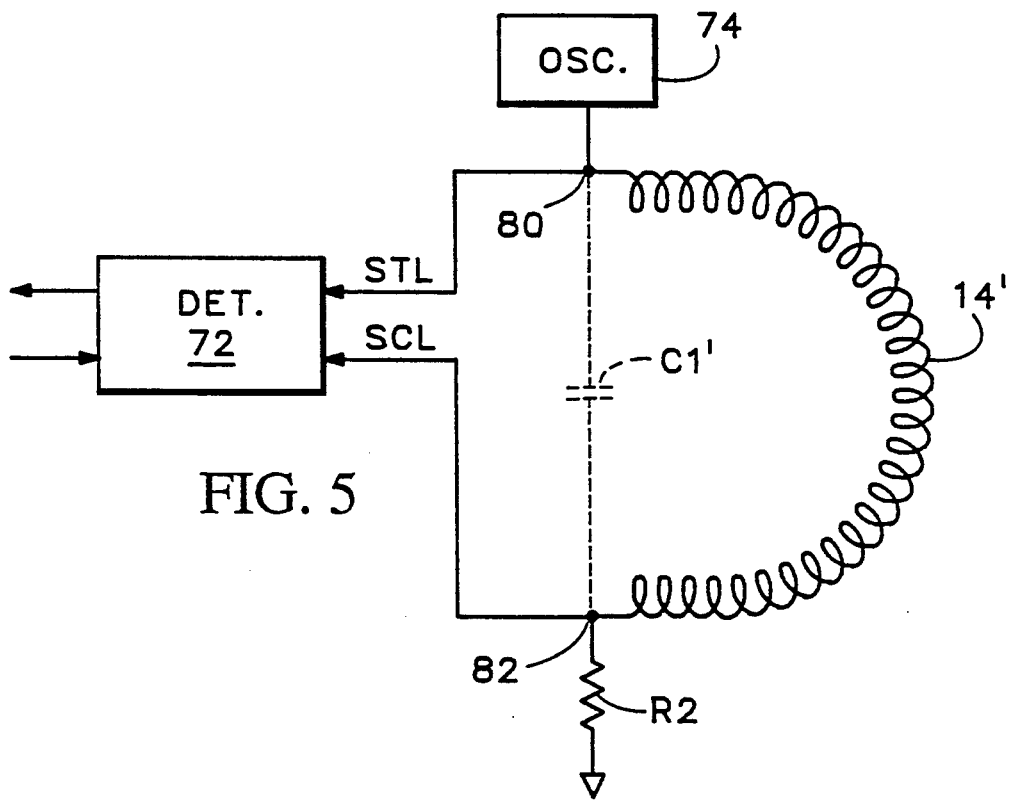
FIG. 5 is a diagram of alternative loop circuitry for the security system according to the present invention.

Instead of employing a loop 14 which is principally resistive in nature, the loop may be constructed to exhibit substantial inductance. For instance, the loop may be formed as indicated at 14' in FIG. 5 as a tightly-wound coil or helix. The loop 14' in FIG. 5 is shown only diagramatically and it will be understood such loop is extended in a physical sense across a boundary such as between door 20 and door jamb 22 in FIG. 1. In a typical instance, the loop 14' is formed as a coil of insulating wire having a diameter of approximately 1 mm, a length of several inches, and a pitch of 30–50 turns per inch. In selecting the loop 14', a random length of coil is selected or cut from a longer stock of preformed coil, and the cut ends are provided with end connections of the type illustrated in FIG. 2. The inductance of the loop is essentially random and not easily duplicated; however, it will be seen that tampering with the loop 14' after installation will have the effect of changing the phase of the SCL signal and will readily register an intrusion incident even though the loop is not broken. That is to say, even moving or rearranging the loop 14' will have the effect of changing the inductive reactance thereof and therefore will change the phase of the SCL signal. The loop 14' may be shunted with a capacitance C1' if desired and/or C1' represents the distributed capacitance of the loop. The circuit may be resonant or anti-resonant at the operating frequency. Of course, the inductance and distributed capacitance of the loop are adjustable by rearranging the position or pitch of a loop 14' coil in the installation of the device, and before initialization thereof as described in connection with the FIG. 8 flowchart.

Figure 6:
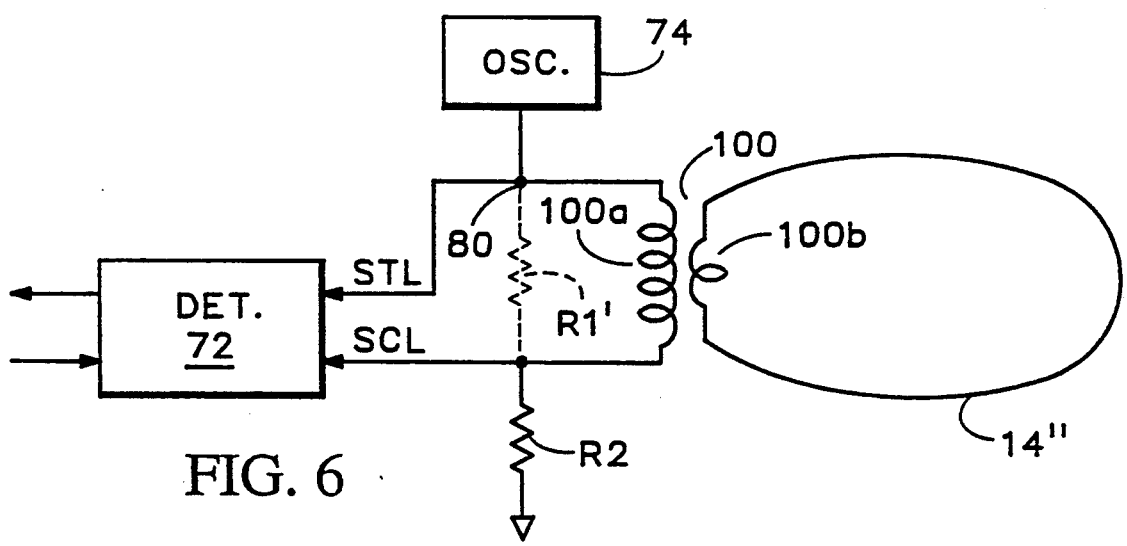
FIG. 6 is a diagram of further alternative loop circuitry employing inductive coupling.

In accordance with another example of the device according to the present invention, the loop may take the form indicated at 14" in FIG. 6 that is separate from and inductively coupled to the detection circuitry by way of mutual inductance or transformer 100 which may be internal to or external of control box 12 in FIG. 1. A "link" coupling is suitably provided wherein primary 100a of the transformer may have a greater number of turns than secondary 100b interconnected with loop 14". The primary may be shunted with resistor R1' or other impedance as desired. Similarly, other impedances can be inserted in series with or in parallel with the loop 14". The mutual inductance 100 need not comprise a conventional transformer, but may instead consist of a coil or conductor 100a which is inductively linked with loop 14". That is to say, primary 100a may comprise a first loop extending from control box 12, having a second loop 14" inductively linked therewith, e.g. a shorted loop or a shorted twisted pair.

Figure 7A:
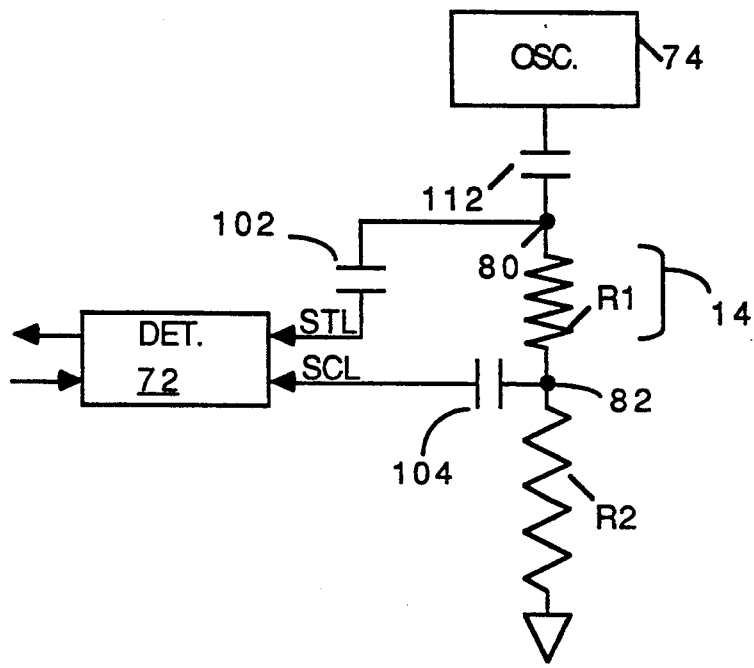
FIGS. 7A and 7B are diagrams of loop circuitry utilizing capacitive coupling.
Figure 7B:
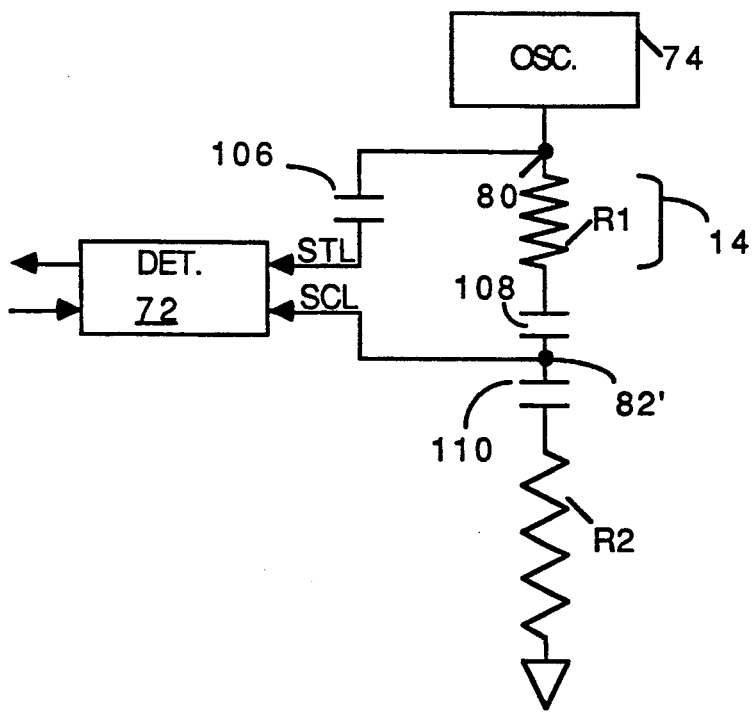

Referring to FIG. 7A and 7B, capacitive means are illustrated for coupling the loop 14 (represented by resistor R1) with detection circuit 72. In FIG. 7A, a first capacitor 102 is interposed between node 80 and the STL input of detection circuit 72, while a capacitor 104 couples node 82 to the SCL input of the detection circuit. Oscillator 74 is coupled to loop 14 by capacitor 112. Alternatively, as illustrated in FIG. 7B, a capacitor 106 is located between node 80 and the STL input of the detector, with the SCL detector input being connected to node 82', which is in turn coupled to resistors R1 and R2 by capacitors 108 and 110 respectively. Although the phase differences detected by circuit 72 will be affected by the capacitive coupling, since the exact impedance of the loop 14 is frequently unknown and essentially random the circuit may be varied to a considerable extent as convenient to provide coupling to the loop. It will also be apparent that the capacitive coupling between detection circuit 72 and resistor R1 in FIG. 7A may have inductive, i.e., transformer, coupling substituted therefor.

Figure 9:
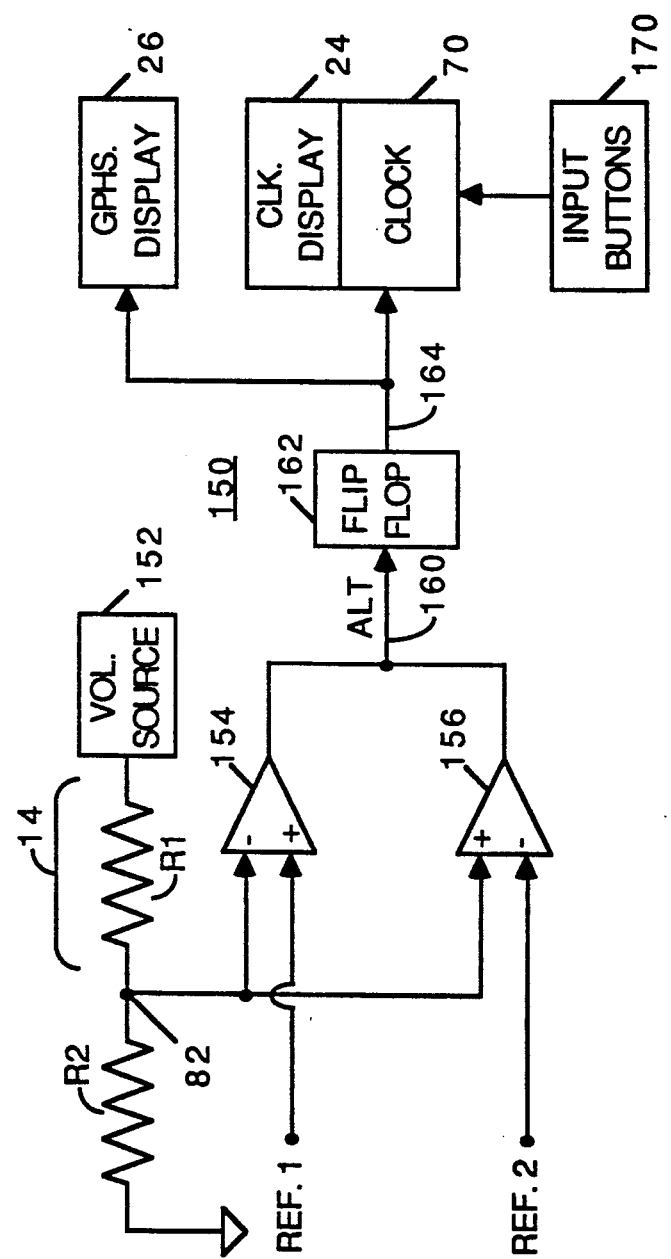
FIG. 9 is a functional block diagram of an alternative embodiment of the present invention.

Referring now to FIG. 9, an alternative embodiment of the present invention is illustrated wherein the electronic system is implemented in hardware. In system 150, a constant source 152 of voltage such as a battery is connected directly to a loop 14 represented by resistor R1 connected in series with resistor R2 to form a voltage divider defining a voltage level VL at node 82 coupled to the inverting input of comparator 154 and to the non-inverting input of comparator 156. The resistance R1 may be randomly disposed along the length of loop 14. The non-inverting input of the comparator 154 is coupled to a source of DC constant reference voltage REF1, while the inverting input of the comparator 156 is connected to a source of constant voltage REF2. The voltages REF1 and REF2 are adjusted so that normally REF1<VL<REF2. If the loop 14 is tampered with such that voltage VL is changed whereby VL<REF1 or VL>REF 2, then signal ALT on line 160 connected to the flip-flop 162 goes high. When the signal ALT goes high, the flip-flop 162 changes state, setting the signal DT on the line 164 connected to the clock 70 and the graphics display 26. As the signal DT goes high, the time reading currently displayed may be frozen on clock display 24, and the graphics display 26 is energized to draw attention to the security device. Time input buttons 170 allow the time kept by the clock 70 and displayed on the clock display 24 to be set prior to installation.

While loop 14 has been described as being formed of wire, it will be appreciated that the wire is advantageously covered with a layer of tough insulating material to avoid measurements, for example of its resistance, by an intruder. Alternatively, the conductive loop itself may be manufactured of resistive plastic cord in turn covered by plastic insulation.

Figure 10:
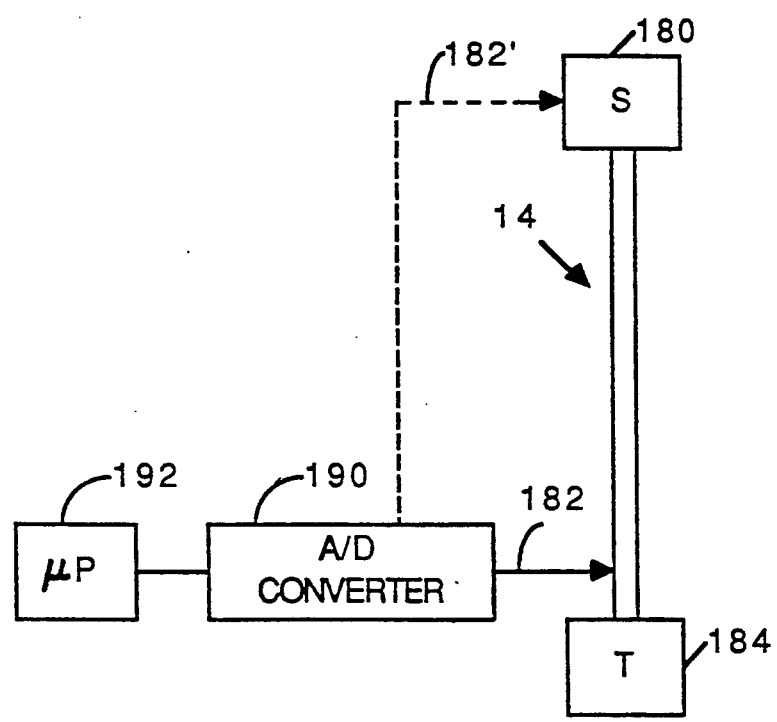
FIG. 10 is a functional block diagram of a further alternative embodiment of the present invention.

Referring to FIG. 10, depicting a further alternative embodiment according to the present invention, loop 14 comprises a transmission line disposed between a radio frequency source 180 and a line termination 184. The transmission line may take any one of a number of forms and may, for example, consist of a length of coaxial cable or strip line on flexible plastic material. The source 180 will normally be included within control box 12 (illustrated in FIG. 1), but the termination 184 can be positioned within control box 12 or elsewhere as hereinafter more fully described. Assuming the termination is located within the control box, tap 182 (corresponding to node 82 in FIG. 3) couples the voltage at the transmission line termination to A to D converter 190, which may include phase sensing means. The digital output of converter 190 is provided to microprocessor system 192 operating in a manner as described in connection with the previous embodiments, so as to input and store the "normal" or undisturbed output of the transmission line, and provide an indication when such output is disturbed through tampering. The termination (184) may be equal in value to the characteristic impedance of the line, but is preferably of some other value such that the voltage at 182 is quite dependent upon the length and the position of the line.

Instead of locating termination 184 within control box 12, it may be positioned elsewhere, e.g. in fitting 16 on the door jamb, with no return of the loop being made to control box 12. The tap is then located at position 182' in FIG. 10 rather than 182, at which point the transmission line voltage is a function of reflections from the termination. The termination suitably has a value other than the characteristic impedance of the line. It will be again seen that substantial tampering with the line is readily detected by a change in voltage at tap 182'. As a further alternative, source 180 may constitute a source of pulses and element 184 may represent plural spaced terminations reflecting plural pulses back to tap 182' that are detectable time-wise by converter 190 as the correct signature or "key" of the line.

It will be appreciated, especially with regard to the embodiments of FIGS. 3–7 and 10, that the loop member can be very sensitive to small changes in impedance as occasioned by the presence of unauthorized personnel close to the loop, according to the programmed sensitivity as to how much the loop impedance may be allowed to vary before registering an intrusion. Different sensitivities may be programmed for different times of day if desired, or an additional sensor or sensors, 73 in FIG. 3, may be programmed or remotely actuated at certain times to sense the approach of a human. The sensor 73 may, for example, comprise a capacitive sensor or an infrared sensor.

It will be apparent that many other changes and modifications may be made without departing from the true spirit and scope of the invention. For example, the aforementioned loop could be formed of superconductive material, the superconductivity of which is destroyed or affected by tampering. The appended claims are therefore intended to cover all such changes and modifications as fall within the true spirit and scope of the invention.

We claim:

1. A portable electronic security device for detecting when a portal has been tampered with, comprising:
    an elongated communications lead (14) adapted for being attached to a side of a portal boundary, said lead having a first end and a second end between which a signal may be transmitted, wherein said lead is characterized by impedance distributed therealong; and
    a signal control module (12) adapted for being affixed to another side of said portal boundary to which at least one end of said lead may also be secured;
    wherein the device includes means (74, 152, 180) for generating a signal for said communications lead, and means (72, 150, 190) for monitoring one or more characteristics of said signal that are responsive to said impedance distributed along said lead for generating an alert signal indicative of alteration of one or more of said characteristics as a result of external tampering, including major disturbances such as shorting and open circuiting of said lead as well as small disturbances including moving and bending of said lead, that effectively change said distributed impedance of said lead;
    said means for monitoring being operable to generate said alert signal when said distributed impedance changes by an amount substantially smaller than would be produced by short circuiting or open circuiting said lead.

2. A portable electronic security device for detecting when a portal has been tampered with, comprising:
    an elongated communications lead (14) adapted for being attached to a side of a portal boundary, said lead having a first end and a second end between which a signal may be transmitted, wherein said lead is characterized by impedance distributed therealong; and
    a signal control module (12) adapted for being affixed to another side of said portal boundary to which at least one end of said lead may also be secured;
    wherein the device includes means (74, 180) for generating a signal for said communications lead, and means (72, 190) for monitoring one or more characteristics of said signal as modified by said impedance distributed along said lead and generating an alert signal indicative of alteration of one or more of said characteristics as a result of external tampering effectively changing said impedance of said lead;
    said electronic security device further including inductive means (100) for coupling said monitoring means to said communications lead.

3. The electronic security device of claim 2 wherein said communications lead comprises a closed loop (14").

4. A portable electronic security device for detecting when a portal has been tampered with, comprising:
    an elongated communications lead adapted for being attached to a side of a portal boundary, said lead having a first end and a second end between which a signal may be transmitted, wherein said lead is characterized by impedance distributed therealong, said communications lead comprising an r. f. transmission line (14); and
    a signal control module (12) adapted for being affixed to another side of said portal boundary to which at least one end of said lead may also be secured;
    wherein the device includes means (180) for generating a signal for said communications lead, and means (190) for monitoring one or more characteristics of said signal as modified by said impedance distributed along said lead and generating an alert signal indicative of alteration of one or more of said characteristics as a result of external tampering effectively changing said impedance of said lead.

5. The electronic security device according to claim 4 wherein only one end of said transmission line (14) is coupled to said control signal module and said means for monitoring (182') monitors reflections or absence of reflections on said transmission line.

6. The electronic security device according to claim 5 wherein said means (180) for generating a signal comprises a source of pulses, there being plural terminations (184) for said transmission line to provide a reflection that is detectable time-wise.

7. The electronic security device according to claim 4 wherein said r. f. transmission line is provided with a termination (184).

8. The electronic security device according to claim 7 wherein said termination (184) has an impedance value other than the characteristic impedance of said transmission line.

9. A portable electronic security device for detecting when a portal has been tampered with, comprising:
    an elongated communications lead (14) adapted for being attached to a side of a portal boundary, said lead having a first end and a second end between which a signal may be transmitted, wherein said lead is characterized by impedance distributed therealong; and
    a signal control module (12) adapted for being affixed to another side of said portal boundary to which at least one end of said lead may also be secured;
    wherein the device includes means (74, 152, 180) for generating a signal for said communications lead, and means (72, 150, 190) monitoring one or more characteristics of said signal as modified by said impedance distributed along said lead for the purpose of generating an alert signal, wherein said monitoring means is normally responsive to the value of said impedance distributed along said lead as determined at least in part by the length of said lead for normally inhibiting generation of said alert signal, while being sensitive to a range of incremental changes in said value of impedance distributed along said lead to generate an alert signal when one or more of said characteristics are altered as a result of external tampering causing said changes in said impedance distributed along said lead, said range of incremental changes which bring about said alert signal extending to impedance changes substantially less than occasioned by shorting and opening said communications lead, in order to facilitate sensitive detection of said tampering.

10. The electronic security device according to claim 9 further provided with means (71) for communicating its status to a remote point.

11. The electronic security device according to claim 9 wherein said means for generating a signal comprises a DC source.

12. An electronic security device for detecting when a portal to a sealed enclosure has been tampered with, comprising:
- a communications lead (14) adapted for being secured on one side of a portal boundary, said lead having a first end and a second end between which a signal may be transmitted;
- a signal control module (12) adapted for being secured on another side of said portal boundary and to which at least one end of said lead may also be affixed;
- means (74, 180) for generating a signal and directing this signal to the first end of said lead, and means (72, 190) for monitoring one or more characteristics of said signal and generating an alert signal indicative of alteration of one or more of said characteristics;
- clock means (70) including display means (24) for displaying real time readings; and
- microprocessor means (52) for reading and recording the time kept by said clock means in response to said alert signal generated by said monitoring means and for controlling said clock means to display said time on said display means.

13. The electronic security device of claim 12 wherein said means for generating a signal comprises an oscillator (74) and said means for monitoring (72) comprises means for detecting voltage levels and phase.

14. The electronic security device of claim 12 wherein said communications loop (14) comprises a conductor having random impedance along its length.

15. The electronic security device of claim 12 further including graphics display means (26) for drawing attention to said device upon the detection of a tampering event.

16. An electronic security device for detecting when a portal to a sealed enclosure has been tampered with, said device comprising:
- a transmission line (14) over which a signal may be transmitted from the first end thereof to the second end thereof;
- means (74, 180) for generating a signal for transmission over said line from said first end to said second end;
- means (72, 190) for monitoring one or more of the characteristics of said signal on said line and generating an alert signal indicative of changes in characteristics resulting from tampering therewith; and
- means (60, 70, 72, 24) for recording time readings in response to said alert signal and for displaying said readings.

17. The electronic security device of claim 16 wherein said means for recording time readings and displaying said readings comprises:
- clock means (70) including display means (24) for displaying real time readings, and
- microprocessor means (52) for recording the time kept by said clock means and controlling said display means to display time readings in response to said alert signal.

18. The electronic security device of claim 16 wherein said means for generating a signal comprises an oscillator (74), and said means for monitoring (72) comprises means for detecting voltage level and phase.

19. The electronic security device according to claim 16 wherein said means for generating a signal comprises an r.f. oscillator (180), and said transmission line comprises an r.f. transmission line (14).

20. The electronic security device of claim 16 further including graphics display means (26) for drawing attention to said device upon the detection of a tampering event.

21. The electronic security device of claim 16 further including sensor means (73) for detecting the approach of personnel.

22. A portable electronic security device for detecting when a portal has been tampered with, comprising:
- a communications lead (14) adapted for being attached to a side of a portal boundary, said lead having a first end and a second end between which a signal may be transmitted; and
- a signal control module (12) adapted for being affixed to another side of said portal boundary to which at least one end of said lead may also be secured;
- wherein the device includes means (74, 152, 180) for generating a signal for said communications lead, and means (72, 152, 190) for monitoring one or more characteristics of said signal and generating an alert signal indicative of alteration of one or more of said characteristics; and
- wherein said means for generating a signal comprises an oscillator (74), and said means for monitoring (72) comprises means (90, 96, 98) for detecting voltage levels and phase.

23. The electronic security device of claim 22 wherein said communications lead comprises a conductor (14) having random impedance along its length.

24. The electronic security device of claim 22 further including graphics display means (24, 26) for drawing attention to said device upon the detection of a tampering event and for displaying the time of such event.

25. The electronic security device of claim 22 wherein said communications lead comprises an inductance coil (14').

26. A portable electronic security device for detecting when a portal has been tampered with, comprising:
- a communications lead (14) adapted for being attached to a side of a portal boundary, said lead having a first end and a second end between which a signal may be transmitted; and
- a signal control module (12) adapted for being affixed to another side of said portal boundary to which at least one end of said lead may also be secured;
- wherein the device includes means (74, 152, 180) for generating a signal for said communications lead, and means (72, 152, 190) for monitoring one or more characteristics of said signal and generating an alert signal indicative of alteration of one or more of said characteristics; and
- wherein said communications lead comprises an r.f. transmission line (14).

27. The electronic security device according to claim 26 wherein only one end of said transmission line (14) is coupled to said control signal module and said means for monitoring (182') monitors reflections or absence of reflections on said transmission line.

28. A portable electronic security device for detecting when a portal has been tampered with, comprising:
- an elongated communications lead (14) adapted for being attached to a side of a portal boundary, said lead having a first end and a second end between which a signal may be transmitted, wherein said lead is characterized by impedance distributed therealong; and a signal control module (12) adapted for being affixed to another side of said portal boundary to which at least one end of said lead may also be secured;

wherein the device includes means for generating a signal for said communications lead, and means for monitoring one or more characteristics of said signal as modified by said impedance distributed along said lead and generating an alert signal indicative of alteration of one or more of said characteristics as a result of external tampering effectively changing said impedance of said lead;

said means for generating a signal comprising an oscillator (74), and said means for monitoring comprising means (90, 96, 98) for detecting voltage levels and phase.

29. A portable electronic security device for detecting when a portal has been tampered with, comprising:

an elongated communications lead (14) adapted for being attached to a side of a portal boundary, said lead having a first end and a second end between which a signal may be transmitted, wherein said lead is characterized by impedance distributed therealong, said lead comprising a conductor having random impedance varying along its length; and a signal control module (12) adapted for being affixed to another side of said portal boundary to which at least one end of said lead may also be secured;

wherein the device includes means (74, 152, 180) for generating a signal for said communications lead, and means (72, 150, 190) for monitoring one or more characteristics of said signal as modified by said impedance distributed along said lead and generating an alert signal indicative of alteration of one or more of said characteristics as a result of external tampering effectively changing said impedance of said lead.

30. A portable electronic security device for detecting when a portal has been tampered with, comprising:

an elongated communications lead (14) adapted for being attached to a side of a portal boundary, said lead having a first end and a second end between which a signal may be transmitted, wherein said lead is characterized by impedance distributed therealong; and a signal control module (12) adapted for being affixed to another side of said portal boundary to which at least one end of said lead may also be secured;

wherein the device includes means (74, 152, 180) for generating a signal for said communications lead, and means (72, 150, 190) for monitoring one or more characteristics of said signal as modified by said impedance distributed along said lead and generating an alert signal indicative of alteration of one or more of said characteristics as a result of external tampering effectively changing said impedance of said lead;

said electronic security device further including graphics display means (24, 26) for drawing attention to said device upon detection of a tampering event and for displaying the time of such event.

31. A portable electronic security device for detecting when a portal has been tampered with, comprising:

an elongated communications lead (14) adapted for being attached to a side of a portal boundary, said lead having a first end and a second end between which a signal may be transmitted, wherein said lead is characterized by impedance distributed therealong, said communications lead comprising an inductance coil (14'); and a signal control module (12) adapted for being affixed to another side of said portal boundary to which at least one end of said lead may also be secured;

wherein the device includes means (74) for generating a signal for said communications lead, and means (72) for monitoring one or more characteristics of said signal as modified by said impedance distributed along said lead and generating an alert signal indicative of alteration of one or more of said characteristics as a result of external tampering effectively changing said impedance of said lead.

32. A portable electronic security device for detecting when a portal has been tampered with, comprising:

an elongated communications lead (14) adapted for being attached to a side of a portal boundary, said lead having a first end and a second end between which a signal may be transmitted, wherein said lead is characterized by impedance distributed therealong; and a signal control module (12) adapted for being affixed to another side of said portal boundary to which at least one end of said lead may also be secured;

wherein the device includes means (74) for generating a signal for said communications lead, and means (72) for monitoring one or more characteristics of said signal as modified by said impedance distributed along said lead and generating an alert signal indicative of alteration of one or more of said characteristics as a result of external tampering effectively changing said impedance of said lead;

said electronic security device further including capacitor means (102, 104, 106, 108, 110) for coupling said monitoring means to said communications lead.

33. A portable electronic security device for detecting when a portal has been tampered with, comprising:

an elongated communications lead (14) adapted for being attached to a side of a portal boundary, said lead having a first end and a second end between which a signal may be transmitted, wherein said lead is characterized by impedance distributed therealong; and a signal control module (12) adapted for being affixed to another side of said portal boundary to which at least one end of said lead may also be secured;

wherein the device includes means (74, 152, 180) for generating a signal for said communications lead, and means (72, 150, 190) for monitoring one or more characteristics of said signal as modified by said impedance distributed along said lead and generating an alert signal indicative of alteration of one or more of said characteristics as a result of external tampering effectively changing said impedance of said lead;

said means for monitoring one or more characteristics of said signal including means for measuring voltage over a length of said lead having said impedance distributed along its length.

34. A portable electronic security device for detecting when a portal has been tampered with, comprising:

an elongated communications lead (14) adapted for being attached to a side of a portal boundary, said lead having a first end and a second end between which a signal may be transmitted, wherein said lead is characterized by impedance distributed therealong; and a signal control module (12) adapted for being affixed to another side of said portal boundary to which at least one end of said lead may also be secured;

wherein the device includes means (74, 152, 180) for generating a signal for said communications lead, and means (72, 150, 190) for monitoring one or more characteristics of said signal as modified by said impedance distributed along said lead and generating an alert signal indicative of alteration of one or more of said characteristics as a result of external tampering effectively changing said impedance of said lead;

said means for monitoring one or more characteristics of said signal and generating an alert signal indicative of alteration including means (60) for storing one or more of said characteristics for comparison with subsequent characteristic values.

* * * * *